Patented Apr. 20, 1954

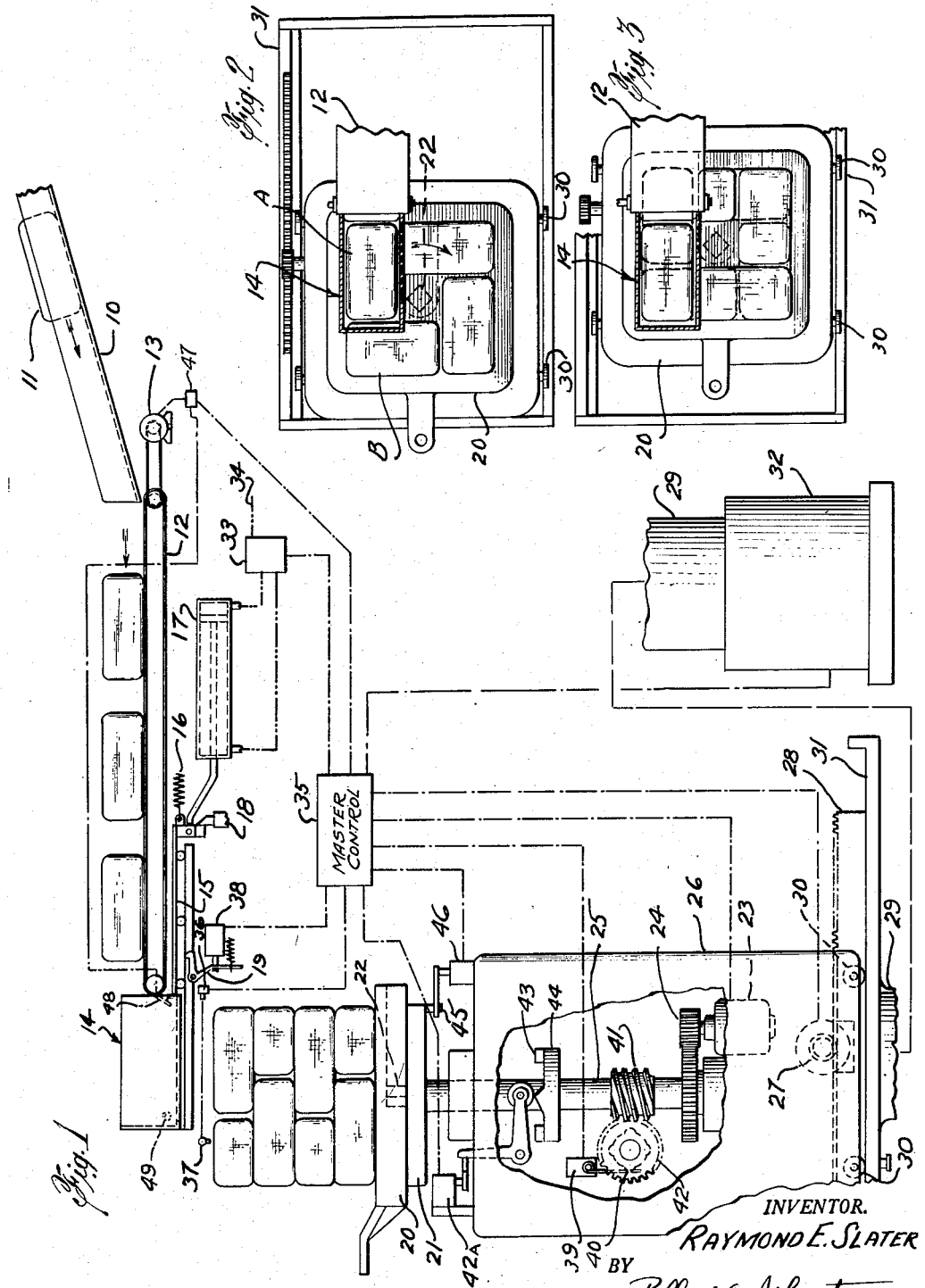

2,675,928

UNITED STATES PATENT OFFICE 2,675,928

MATERIAL HANDLING APPARATUS

Raymond E. Slater, New Rochelle, N. Y., assignor of one-half to W. J. Warburton Associates, Inc., New York, N. Y., a corporation of New York Application April 14, 1950, Serial No. 155,880

3 Claims. (Cl. 214—6)

This invention relates to an article handling apparatus for handling filled containers, such as sugar bags, so as to pile the bags into a predetermined relationship on a pallet for transportation purposes.

It is desirable where a material, such as sugar, is loaded in bags, to pile the bags for handling purposes on a pallet. The loaded pallet then can be moved by pallet handling devices to a desired location such as a freight car, etc. In the case of sugar bags, for example, each weighs about 60 pounds and is awkward to handle. After filling, the bags must be transferred from the filling point to a pallet loading point.

One of the objects of the invention is to automatically pile sugar bags, or the like, in a predetermined manner on a pallet.

Another of the objects is to stack the bags on the pallet in an overlapping and locking relationship.

In one aspect of the invention, the bags are carried down a chute onto a conveyor belt to an automatic release point. At this point, they are released in such a manner as to be piled on a pallet in a predetermined arrangement. The pallet is arranged to be placed on a pallet table or holder in such a way that it can be rotated at predetermined times, so as to pile the bags in each layer in a desired relationship thereon. Thereafter, succeeding layers can be piled on the pallet in an overlapping relationship, the pallet being automatically and successively lowered for each layer.

In a preferred form, the pallet table or holder is arranged to be moved at right angles to its vertical movement after each layer has been placed thereon so as to arrange the bags in an overlapping relationship on the pallet as will be explained hereafter.

Another object of the invention is to provide an automatic control mechanism for the apparatus so as to automatically pile the bags in the desired order upon the pallet. The automatic control can include means to deposit a bag on the pallet, automatically turn the pallet, lower the pallet, and move the pallet sideways.

These and other objects, advantages and features of the invention will become apparent from the following description and drawings which are merely exemplary.

In the drawings:

Figure 1 is a fragmentary diagrammatic view of one form of the invention.

Figure 2 is a fragmentary top view showing one layer of bags piled on the pallet.

Figure 3 is similar to Figure 2 with the exception that the pallet has been moved to the right so that the next layer of bags has been placed on the pallet in overlapping relationship.

The invention will be described in conjunction with the loading of bags on a pallet but it is to be understood that similar articles or containers can be loaded with the apparatus of the invention.

In Figure 1, a chute 10 delivers bags 11 to the endless conveyor belt 12, said belt being driven by a suitable motor 13.

Trap door or bag release mechanism 14 receives the bags from the belt in readiness to be dropped or transferred to the pallet. The belt will urge the bag into its correct position in the release or escapement mechanism as will be explained hereafter. A movable switch operator 48 can be normally urged upwardly and arranged to be moved down as a bag is deposited on the trap door, the switch operated thereby being used to operate suitable relays controlling switch 47 controlling the belt motor. The bags may be spaced as shown or may be together on the belt. The bag release mechanism may have three vertical walls and a movable bottom closure wall 15, shown in open position in Figure 1, just after a bag has been dropped. The movable closure wall 15 may have a suitable spring 16 for pulling it rapidly to open position. Hydraulic motor 17 of any suitable type can be provided to move the bottom wall 15 to the left (Fig. 1) or closed position in readiness to receive the next bag. The bottom wall will hold the bag until the pallet has been moved to a position in readiness to receive the next bag to be dropped. A mechanical operator, such as a powered linkage, cam, or other mechanism can be used. A stop 18 limits movement of the bottom wall 15 to the right by the spring or other mechanical or air device, and a latch mechanism 19 serves to engage suitable elements associated with the closure wall 15 for releasably holding the bottom wall in closed position. As mentioned, other operating means can be used to move the escapement or closure wall, or to serve as an escapement mechanism controlling the flow of bags onto the pallet to be loaded.

Pallet 20, of any suitable type, can be placed or loaded on the pallet turntable 21. A suitable non-round projection 22 can be provided on the turntable engageable with a mating slot in pallet 20, so that the pallet will be turned therewith. Also, friction alone can be depended upon to keep the pallet located thereon, although it is preferable to have a positive means to accomplish the purpose. Turntable 21 can be turned by means of motor 23 operating through gear train 24 and shaft 25.

The pallet turntable is carried by a turntable turning mechanism housing 26. The turning mechanism housing can have a motor 27 thereon engageable with a gear rack 28 on the pallet raising and lowering platform 31 for moving the pallet at right angles to its vertical movement so as to stack the bags in a predetermined arrangement on the pallet. An air or hydraulic device may be substituted for the rack and pinion. Piston 29 can move platform 31 vertically.

Wheels 30 can be employed for the purpose of facilitating movement of the housing and pallet turntable on the platform 31 carried by the raising and lowering mechanism 32 but other supports such as a roller or ball bearing assembly can be used. It is apparent that other types of raising and lowering mechanism can be used.

A master control box 35 can be provided having suitable electrical controls, relays, and circuits for operating the various portions of the control circuit as will be described hereafter, electrical connections thereto being indicated by dot-dash lines. A fluid control valve 33 governing air or other fluid from a source of fluid supply 34 to fluid motor 17 can have control connections with the master controller. A photo-electric cell 36 responsive to light from source 37 can be employed to initiate movement of parts upon interruption of the light beam by a bag. The first bag can be dropped by operating a suitable push button (not shown) to trip latch 19.

Piston 29 can be operated to move the turntable 21 upwardly after an empty pallet has been loaded thereon to an upper position to receive the first layer of bags, the pallet being to the left on the platform 31 as illustrated in Figure 1 and Figure 2. Upon appropriate actuation or activation of the master control by a push button or other conventional control, with a bag on the closed closure wall 15, solenoid 38 can be arranged to be actuated to release the escapement member 15 so that it will be rapidly pulled by spring 16, or other mechanism, to the right and permit a bag to fall on the pallet to the position illustrated at "A" in Figure 2. As a bag is deposited on the trap door, switch operator 48 through its associated switch will stop the belt until the bag has fallen and released switch operator 48 so as to restart the belt. A photoelectric cell 49 could be used in place of the switch 48 to control the belt.

As the falling bag interrupts the light beam from photo-cell 36, or trips other control mechanism, the master control through suitable conventional relays will energize motor 23 to start rotation of the pallet turntable. The photo-electric cell also sequentially will actuate valve 33 to return the escapement door 15 to closed position. Upon rotation of the pallet turntable 90°, switch 39 will be operated by one of the four cam projections 40, moved by the worm 41 and gear 42, to stop the pallet turntable in readiness to receive the next bag by interrupting suitable conventional relays. At this time, switch 42A can be arranged to be actuated by cam 43 on cam collar 44 to energize or control solenoid 38 and permit a second bag "B" to fall on the pallet, it being assumed that the turntable has turned 90° in Figure 2 so that point "B" is under the escapement door. As the next bag interrupts the light beam, rotation of the turntable again will be started and the operations continued until four bags have been deposited upon the pallet in the relative positions illustrated in Figure 2. It is preferred to have two switches 39 and 42A to control stopping of the turntable and release of the next bag, but one can be used.

At the time the fourth bag is placed thereon, or upon the completion of 360° rotation, projection 45 on the bottom of the pallet turntable will actuate switch 46 which in turn through relays will cause the fluid cylinder 32 to have the pressure therein decreased so as to move the pallet and housing 26 down one step in readiness to receive the next layer of bags.

It is often desirable to have the bags overlap each other in the various rows as illustrated in Figure 1 and Figure 2 necessitating movement of the pallet relative to the escapement door. Such an orderly and locking arrangement of the bags presents a superior method of stacking. In order to accomplish this, motor 27 also is energized after completion of a row so as to move the housing 26 to the right and into the position illustrated in Figure 3 in readiness to receive the next bag which will be deposited across or straddling two of the bags on the preceding layer as can be seen in dotted lines in Figure 3. Solenoid 38 then will be tripped so as to permit the next bag to be deposited upon completion of the described movements of the turntable in changing from one layer to another.

The operation then is continued until four bags have been deposited, at which time switch 46 again will be energized to lower the mechanism one more step and return housing 26 to the left, and thus again cause a straddling or overlapping relationship to occur when the next row is deposited. There may be any desired number of layers of bags depending upon the weight and size thereof and the particular handling conditions encountered.

Upon completion of the loading of the pallet, suitable lifting mechanism may be brought into play to lift the pallet off the turntable and transport it away. A new pallet then can be placed on the table, the master control operated to raise the turntable upwardly into position with a new pallet thereon, and the operation repeated. If desired, the removal and replacing of the pallet on the turntable can be automatically arranged.

It is evident that various details may be altered including the number of bags or articles for a layer and that portions of the invention can be used without departing from the spirit of the invention except as defined in the appended claims.

What is claimed is:

1. In a device for loading bags or the like onto a pallet in layers and in staggered relationship, the combination comprising a bag feeding escapement mechanism for feeding bags onto a pallet, control means feeding a bag from said escapement mechanism onto a pallet thereunder upon activation thereof, a pallet holding turntable having means rotating the same, means connected to said turntable for raising and lowering said turntable, means for moving in timed relation said turntable horizontally a predetermined amount at the end of a complete revolution so that the next bag deposited will straddle bags upon which it rests, and control mechanism turning said table a predetermined amount upon deposit of each bag thereon for receiving the next bag in the same layer, lowering said turntable a predetermined amount upon completion of a layer in readiness to receive the next layer, and moving said turntable in alternate horizontal directions the required predetermined amount upon completion of each revolution of said turntable, so as to pile the bags in locking relationship thereon.

2. In a material handling device for loading bags or the like in staggered relation in layers on a pallet, the combination comprising a belt conveyor for delivering said bags, an escapement trap means receiving bags from said conveyor in readiness for delivery to a pallet, movable support means carrying a pallet under said trap means, said support means having means to rotate the same and means to vertically move the support, means connected to said trap releasing a bag therefrom onto said pallet, support means rotating control mechanism actuated by release of bags therefrom causing rotation of said support means a predetermined amount less than a complete revolution for each bag, and control mechanism operated by turning of said support means and upon completion of said predetermined movement of said support means initiating deposit of another bag on said pallet.

3. In a material handling device for loading bags onto a pallet, the combination comprising an escapement trap receiving bags from conveyor means and holding them for delivery onto a pallet, a pallet support adapted to hold a pallet, means vertically moving said support away from said trap, means rotating said support after the deposit of each bag thereon, and control means for the pallet support rotating and vertical moving means including mechanism responsive to the passage of a bag from said escapement trap to activate automatically said pallet support rotating means and vertically moving said support upon completion of each revolution.

References Cited in the file of this patent

UNITED STATES PATENTS

| Number | Name | Date |
|---|---|---|
| 1,208,802 | Lienan | Dec. 19, 1916 |
| 1,551,890 | Luce | Sept. 1, 1925 |
| 1,974,165 | Stage | Sept. 18, 1934 |
| 2,323,174 | Wikle | June 29, 1943 |
| 2,401,592 | Von Stocker | June 4, 1946 |
| 2,546,501 | Hamilton | Mar. 27, 1951 |

FOREIGN PATENTS

| Number | Country | Date |
|---|---|---|
| 408,998 | Germany | Jan. 29, 1925 |